Patented Feb. 24, 1953

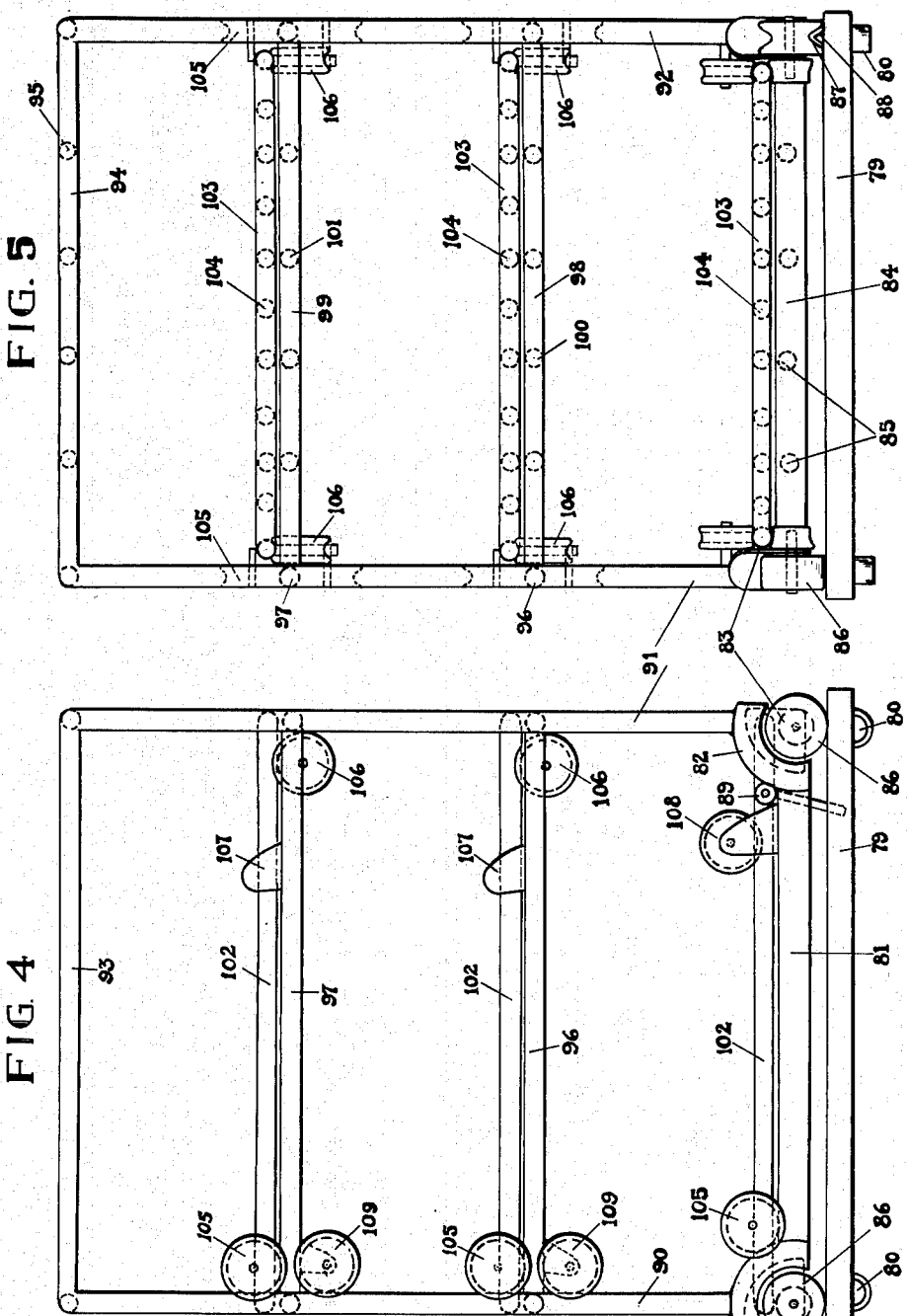

2,629,232

UNITED STATES PATENT OFFICE 2,629,232

PROCESS AND APPARATUS FOR AGING MEATS AND STORING VEGETABLES

Allen Latham, Jr., Jamaica Plain, Mass., assignor, by mesne assignments, to Hodges Research and Development Company, San Francisco, Calif., a corporation of California Application October 27, 1947, Serial No. 782,348

10 Claims. (Cl. 62—102)

This invention relates to a process and apparatus for the aging of meats or the storage of green vegetables and more particularly to such a process and apparatus utilizing controlled conditions of temperature, humidity and air flow adjacent the meat or vegetables.

Heretofore various processes and apparatus have been proposed for the aging of meat or the storage of green vegetables suggesting the use of various humidities, temperatures and rates of air flow but all of these, so far as I am aware, have been unsatisfactory due to excessive drying of the food during aging or storing resulting in burns or due to the formation of slime and graying and the like on the food as the result of condensation on the food of moisture from the surrounding air or due to the formation of mold thereon as a result of stagnation of the surrounding air. In this connection it has heretofore been impossible to maintain a uniform temperature throughout a refrigerated enclosure and temperature variations in such enclosures have been particularly noticeable at the walls. When high humidities (96% R. H.) are maintained within such an enclosure a one degree change in temperature causes a 8% (approximate) change in relative humidity.

It has been heretofore proposed and I believe that in both the aging of meat and the storage of fresh vegetables that high humidities approaching the neighborhood of 96% R. H. are desirable and that temperatures of approximately 34°–40° F. should be maintained for optimum results. In the aging of meat the cooled humid air should be passed over and around the meat at a linear velocity up to approximately seventy feet per minute. In the case of fresh vegetables circulation of the cooled humid air should be held to a minimum consistent with the maintenance of a uniform temperature through the enclosure approximating ten linear feet per minute.

It is accordingly an object of the present invention to provide a novel process and apparatus for the aging of meat and the storage of vegetables wherein controlled conditions of temperature, humidity and air flow can be selected and maintained.

Another object is to provide such a process and apparatus in which relatively high humidities are maintained with a minimum of condensation at temperatures approximating 34°–40° F.

Another object is to provide such a process and apparatus in which uniform temperatures are maintained throughout the enclosure to prevent local over-cooling.

Another object is to provide such a process and apparatus in which for the aging of meats the cooled humid atmosphere of the enclosure is circulated over the meat at appreciable velocities in the neighborhood of seventy linear feet per minute.

Another object is to provide such a process and apparatus in which for the preservation of green vegetables the cooled humid atmosphere of the enclosure is circulated over the vegetables at the lowest possible velocities consistent with the maintenance of uniform temperatures within the enclosure approximating ten linear feet per minute.

Another object is to provide such apparatus in which temperature variations at the walls of the enclosure are maintained at a minimum.

Another object is to provide such apparatus in which temperatures varying less than 1° F. are maintained throughout the enclosure and adjacent the refrigerating coils.

Another object is to provide such apparatus in which the walls of the enclosure are maintained at uniform temperatures by the circulation of cooled, humid air thereover.

Another object is to provide such apparatus in which the walls of the enclosure are cooled by the passage of cooled humid air thereover to maintain uniform temperatures at the walls, the cooled humid air then passing through the body of the enclosure to maintain desired conditions of temperature and humidity therein.

Another and still further object of the present invention is to provide a novel refrigerating system for the apparatus of the present invention employing a conventional refrigerant.

Another object is to provide such a refrigerating system in which temperature variations of the air at the refrigerating coils are held below 1° F.

Other and further objects of the present invention will appear from the following description.

My invention is capable of expression in many mechanical embodiments one of which is shown in the accompanying drawings to illustrate the invention. This embodiment should in no way be construed as defining or limiting my invention and reference should be had to the appended claims for this purpose. It is to be understood that my invention can be applied not only to a refrigerated box but also to all types of refrigerated vehicles, rooms, buildings and other refrigerated devices both permanent and portable.

In the drawings, in which like reference characters designate like parts,

Fig. 4 is a side elevation of the food-supporting cart of Fig. 1 in enlarged detail; and Fig. 5 is a view of the cart of Figs. 1 and 4 as seen from the right in these figures.

Figure 1:
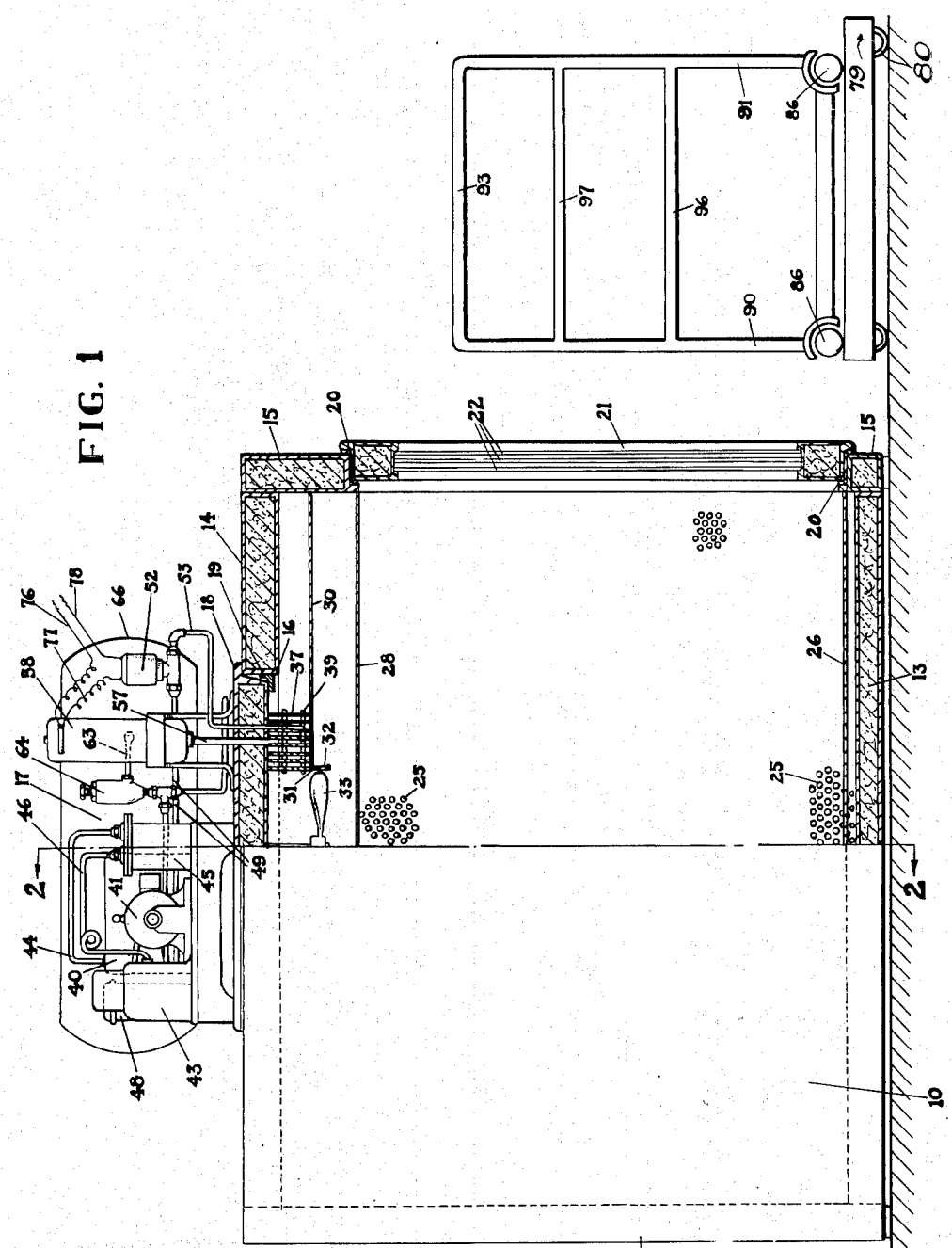
Fig. 1 is a side elevation of a refrigerated box embodying my invention, partly in section to show interior box construction, and showing the food-supporting cart outside of the box.
Figure 2:
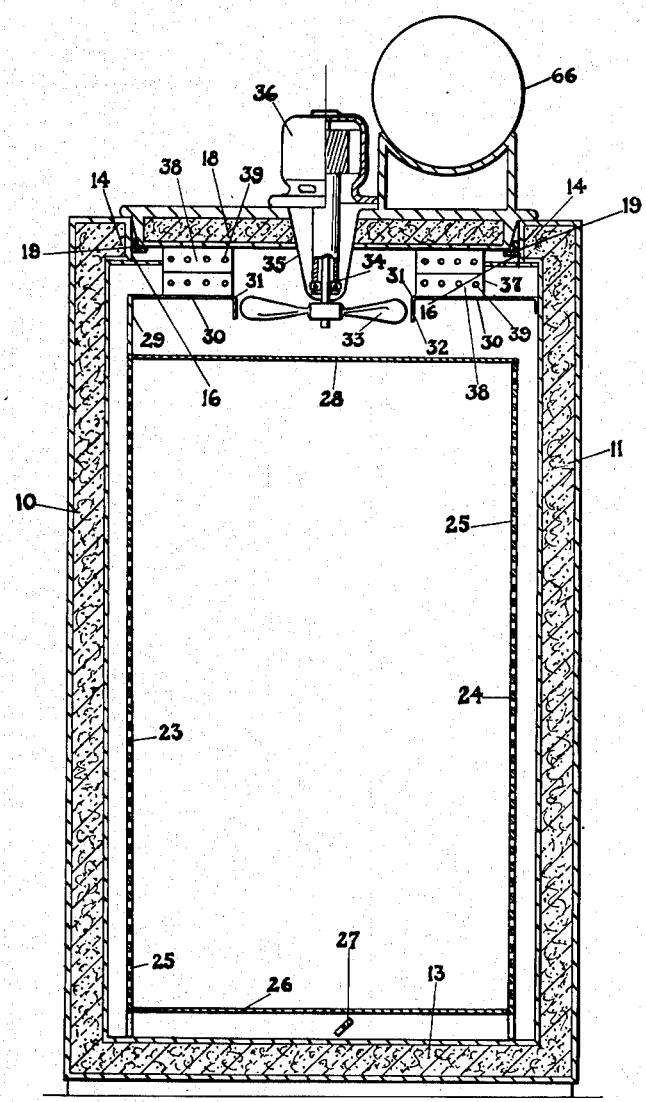
Fig. 2 is a cross sectional view of the embodiment of Fig. 1 on the line 2—2 thereof with a part of the refrigerating system removed for clarity of illustration.

Referring more particularly to Figs. 1 and 2, the embodiment of my invention there shown is a refrigerated box. The box shown in these figures in actual size has a net capacity of approximately 120 cubic feet with net inside dimensions of approximately six feet in height, three feet in width and six and one-half feet in length. This box is made up of conventionally insulated side walls 10 and 11, insulated rear wall 12, insulated bottom 13, insulated top 14 and insulated front 15. Top 14 is rectangularly cut away at 16 to receive refrigerating apparatus generally indicated at 17. Apparatus 17 is mounted as a unitary structure on insulated platform 18 designed to fit snugly in opening 16, gaskets 19 being provided to obtain an air-tight seal therebetween. Front 15 is rectangularly cut away at 20 to receive a conventional type heat insulated door 21 which may be provided with one or more glass panels 22 to permit viewing of the interior of the box.

Spaced from side walls 10 and 11 within the box are porous walls 23 and 24. The spacing of these walls will vary with the size of the enclosure to be cooled because of the volume of air which must be provided but in any event this spacing should be the maximum consistent with economic considerations to minimize pressure drop from top to bottom of the walls. In the present embodiment this distance approximates two inches. Walls 23 and 24 extend from rear wall 12 to front 15 and form air-tight seals therewith. Walls 23 and 24 may be made of any suitable material such as metal and are provided with a plurality of spaced small diameter perforations 25 of actual diameter of $\frac{1}{16}''$ on $\frac{7}{32}''$ centers covering the entire area of the walls or may be made of other suitable porous material such as cloth. Whatever the porous material used it should have approximately 8% open area with a pressure differential across each porous wall of approximately $\frac{1}{16}''$ of water to get uniform air distribution therethrough. A false bottom 26 extends between walls 23 and 24 and from rear wall 12 to front wall 15 and a suitable damper 27 may be provided in the space between bottoms 13 and 26.

Wall 24 terminates at ceiling member 28. Member 28 is impervious to air, extends from rear wall 12 to front wall 15 forming air-tight seals therewith and extends across the interior of the box and forms an air-tight joint with wall 23. Wall 23 has an imperforate extension 29 which forms an air-tight seal with partition member 30. Partition 30 extends across the box to wall 11 with which it forms an air-tight seal. Member 30 also extends from rear wall 12 to front wall 15 forming air-tight seals therewith. Partition 30 is circularly cut away at 31 and opening 31 is provided with a downwardly extending rim 32.

A suitable fan 33 is mounted for rotation in opening 31 within rim 32 and is carried by shaft 34 which is rotatably mounted in bracket 35 mounted in platform 18. Motor 36 drives shaft 34 and fan 33. In the present embodiment the size of fan 33 and its speed are such that it has a capacity of approximately 2000 cubic feet per minute.

Carried by platform 18 and arranged about opening 31 is refrigerating coil 37 made up of a plurality of fin plates 38 through which tubing 39 passes in a continuous circuit four courses wide and two courses deep. Tubing 39 is connected into the refrigerating system as will more fully appear hereinafter.

Figure 3:
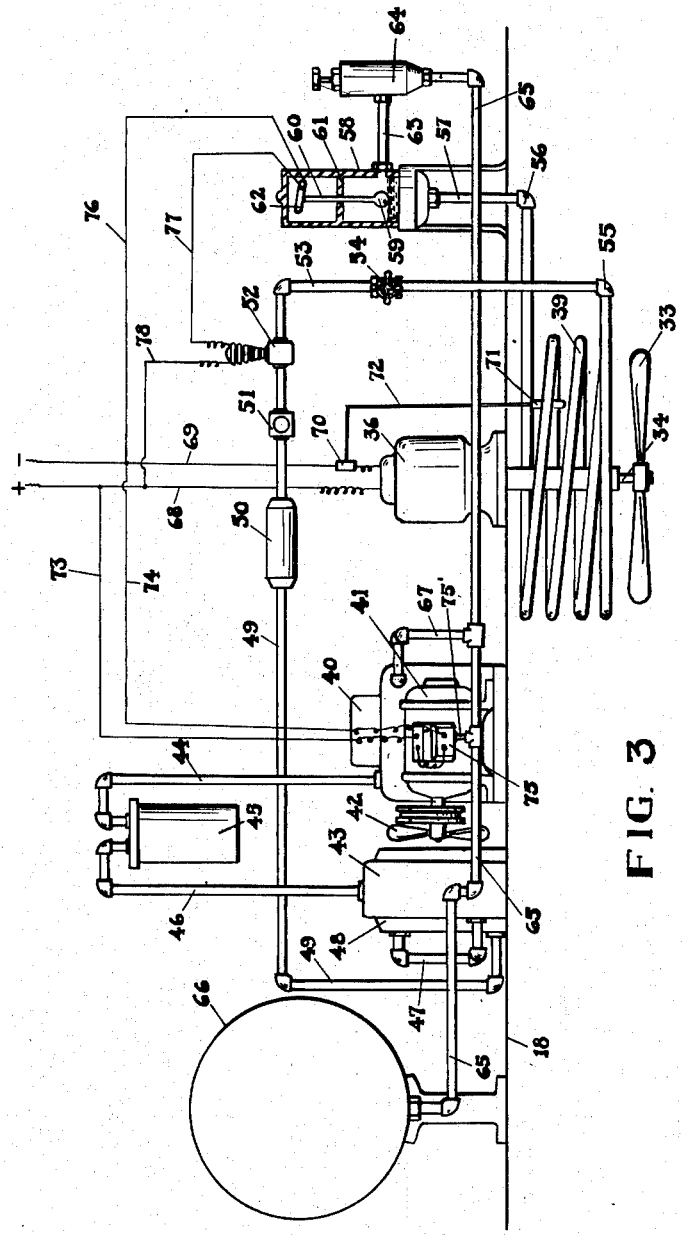
Fig. 3 is a schematic representation of a refrigerating system used with the embodiment of Fig. 1.

A suitable flooded refrigerating system for use with the present invention is shown schematically in Fig. 3 and as above noted is constructed as a unit and mounted on platform 18. This system is described as a flooded system since it is so designed and operated that the refrigerating coils made up in part of tubing 39 will at all times be in contact with liquid refrigerant. This system includes a suitable compressor 40 for the refrigerant, hereafter described as "Freon," a fluorine refrigerant but any other conventional refrigerant such as methyl chloride may be used, in vapor state which places the same under approximately 150 pounds pressure at room temperature. Compressor 40 is driven by a suitable motor 41 which also drives fan 42 supplying air to air cooled condenser 43. Compressed "Freon" vapor is taken from compressor 40 by pipe 44 and passes through a conventional oil separator 45. From separator 45 the cleaned and compressed "Freon" is taken by pipe 46 to condenser 43 where it is condensed to liquid form and is then led by pipe 47 to receiver 48 where the "Freon" is held at room temperature in liquid state at approximately 150 pounds pressure. Liquid "Freon" is taken from receiver 48 by pipe 49 and passes through a conventional drier 50 and visual flow indicator 51 and backs up against a suitable solenoid actuated valve 52. Pipe 53 leads from valve 52 through manually operable expansion valve 54 which is normally open and connects into tubing 39 at 55. Tubing 39 at its discharge side connects at 56 with pipe 57 opening into float chamber 58. Float chamber 58 carries float 59 and float rod 60. Rod 60 is mounted for reciprocating movement in and is guided by partition 61. A suitable switch is mounted in chamber 58 for actuation by rod 60 and is here shown as a conventional mercury switch 62. Pipe 63 leads from chamber 58 to a suitable adjustable back pressure regulating valve 64. Valve 64 is responsive to the pressure in pipe 63 of the gaseous "Freon" and is normally set to open at a pressure of approximately 30 pounds per square inch which corresponds to a temperature in the box of approximately 40° F. but in any event set to a pressure corresponding to the desired temperature for the interior of coil 39. Pipe 65 leads from valve 64 to surge tank 66 and is connected by pipe 67 to the intake side of compressor 40.

Electric current is taken from any suitable source of supply by wires 68 and 69 to fan motor 36. A thermostatically controlled switch 70, actuated by conventional bulb 71 located adjacent refrigerating coil 37 through tubing 72, is connected in series in wire 69 to prevent actuation of motor 36 until refrigerating coil 37 has cooled to a desired temperature. Wires 73 and 74 lead from wires 68 and 69, respectively, to supply current to motor 41 through a conventional pressure responsive switch 75. Switch 75 is actuated by pressures in pipe 65 through connection 75'. Wire 76 leads from wire 69 to one pole of mercury switch 62 and wire 77 leads from the other pole of switch 62 to solenoid switch 52. Wire 78 completes the circuit leading from solenoid switch 52 to wire 68.

A wheeled rack is shown in Figs. 1, 4 and 5 for supporting the food within the box during aging or storage which provides a minimum of resistance to the circulation of air within the box. A dolly 79 provided with rollers 80 carries the rack when outside the box and is of a sufficient height to enable the rack to be pushed into the box without lifting. The rack is made up of hollow metallic tubular elements welded together where they abut. Side elements 81 are welded to arcuate-shaped wheel supports 82 having depending flanges 83. End elements 84 are welded to flanges 83 to form a rectangular rack base. Tubular members 85 extend between elements 84 and are parallel to side elements 81. Wheels 86 are rotatably mounted on flanges 83. The wheels 86 of one side of the rack may be provided with circumferential grooves 87 for engagement with a track 88 mounted on dolly 79 to keep the rack in place during movement. A manually operable pin 89 passing through member 81 and into dolly 79 locks the rack in place on the dolly.

Uprights 90, 91, 92 are welded to supports 82 to form three end members for the rack. The fourth end member is not shown. Tube 93 joins uprights 90 and 91 at their tops and tube 94 connects uprights 91 and 92 at their tops. The top framework is completed by tubes secured to the uprights at their tops and extending parallel to tubes 93 and 94 and not here shown. Tubes 95 extend parallel to tube 93 between tube 94 and its counterpart, not shown.

Vertically spaced on uprights 90 and 91 and parallel to elements 81 are tubes 96 and 97. Tubes 98 and 99 extend from upright 91 at the junction of tubes 96 and 97 therewith to upright 92 and are parallel to element 84. Each of these frames is completed by tubes secured to the uprights and extending parallel to tubes 96, 97, 98 and 99. Tubes 100 and 101 extend parallel to tubes 96 and 97, respectively, and extend from tubes 98 and 99, respectively, to their counterparts, not shown.

Sliding trays are provided for each of the vertically disposed frames just described and for the base frame. These trays are made up of side elements 102 and end elements 103 with intermediate elements 104 extending parallel to elements 102 from end elements 103 to their counterparts, not shown. Each tray is provided with rollers 105 engaging elements 81 and tubes 96 and 97 to support one end thereof and tubes 96 and 97 are provided with rollers 106 to engage elements 102 to support the other end of the trays. Tubes 96 and 97 are provided with stops 107 to limit the extension of the trays outside of the rack. Elements 81 are provided with rollers 108 engaging the tops of tubes 102 to prevent upsetting of the tray when extended and to act as a stop for the tray. The upper trays are provided with downwardly extending rollers 109 engaging the underside of tubes 96 and 97 to prevent upsetting of these trays when extended.

With the embodiment of my invention set up as above described when it is desired to use the same for the aging of meat, electric current is supplied to wires 68 and 69 and motor 41 and compressor 40 are started. Switch 70 is open and motor 36 and fan 33 are not energized. Operation of compressor 40 backs liquid "Freon" up against normally closed solenoid valve 52 at approximately 150 pounds pressure per square inch at room temperature. Refrigerating coils 37 are not flooded at this time and float 59 is in lowered position in chamber 58 allowing switch 62 to close the circuit to solenoid valve 52. Valve 52 is then opened and liquid "Freon" passes through valve 52. A drop of pressure to thirty pounds per square inch occurs at valve 52 and the "Freon" boils passing through tubing 39 and coil 37 as a boiling liquid. Coil 37 is cooled by the boiling "Freon." The "Freon" still in liquid state passes through pipe 57 to float chamber 58 and as coil 37 becomes flooded float 59 actuates switch 62 to close solenoid valve 52. Valve 64 is preset, as above described, to open at a pressure corresponding to the desired temperature in coil 39 and remains closed until the pressure in pipe 63 created by vaporized "Freon" reaches this value. Valve 64 then opens and vaporized "Freon" passes through pipe 65 to pipe 67 and compressor 40. Valve 64 remains open until the "Freon" vapor pressure falls below thirty pounds at which time valve 64 closes. "Freon" vapor passing through valve 64 lowers the level of liquid "Freon" in coil 37 and chamber 58 and from time to time the float 59 causes switch 62 to open solenoid valve 52 to admit liquid refrigerant to coil 37.

Compressor 40 will run continuously until coil 37 reaches the temperature for which valve 64 is preset. Thereafter compressor 40 will be energized from time to time upon demand. Tank 66 collects vaporized "Freon" passed through valve 64 during periods when compressor 40 is not running and holds the vaporized "Freon" until a sufficient pressure is available to energize switch 75. Tank 66 thus acts to prevent excessive starting and stopping of compressor 40 and evens out its periods of operation.

When coil 37 reaches the temperature determined by the setting of valve 64, bulb 71 will close switch 70 and fan motor 36 will be energized and fan 33 is started. As above described for the embodiment under consideration, fan 33 has a capacity of 2000 cubic feet per minute. This air is drawn from the area between wall 11 and wall 24, from between bottoms 13 and 26 depending upon the position of damper 27, and from the interior of the box through openings 25 in wall 24 and is passed over coil 37 where it is cooled. The air passes over coil 37 at from 750 to 1000 linear feet per minute as contrasted to the velocity in the box of up to 70 linear feet per minute. This high air velocity over coil 37 prevents temperature differences of more than approximately 1° F. between the air and coil 37. The cooled air is then passed downward between walls 10 and 23 and passes out into the interior of the box through opening 25 in wall 23, a part of the cooled air, depending upon the position of damper 27, passing between the bottoms 13 and 26. A current of cooled and humid air, the relative humidity of the air is increased as its temperature is lowered and at 40° F. is approximately 92.96%, is created in the interior of the box extending from wall 23 to wall 24 having a velocity of approximately fifty linear feet per minute. The current of cooled and humid air passing along walls 10 and 11 and across bottom 13 keep these walls at the temperature of the interior of the box and prevent local changes of temperature at the walls and bottom. When the box has reached the temperature for which valve 64 is preset, 40° F. in this embodiment, it will be found that by reason of the large volume of air passing over coils 37 and because the walls and bottom of the box are cooled by circulating air that there is less than 1° F. variation of temperature within the box or adjacent the walls, top or bottom. Optimum conditions for aging meat are available.

The meat to be aged is evenly distributed over the shelves of the rack and door 21 is opened to permit the rack to be rolled into the box. When the rack is in place in the box and door 21 is shut it will be found that the air passing across the box suffers minimum disturbance by reason of the rack construction. Moreover, the uniform distribution of air from openings 25 of wall 23 and the uniform withdrawal of air through wall 24 causes a mass movement of the air in the refrigerated space so that dead air pockets adjacent pieces of meat are minimized. The velocity of the air passing over parts of the meat is of course reduced by reason of the size and shape of the pieces of the meat but is not reduced to a degree harmful to the meat. The meat is uniformly cooled by the passage of cooled air over it and a minimum dehydration of the meat occurs by reason of the uniform high relative humidity of the air. At the same time the uniform temperature maintained within the box precludes more than nominal condensation of the moisture of the air upon the meat and the meat is aged without the formation of molds and the like.

When the box is to be used for the storage of vegetables it is cooled as above described to approximately 35°–40° F. and 92–96% R. H. with circulation of air in the box and between the walls and floor to obtain uniform cooling throughout. If vegetables only are to be stored temperature in the lower part of this temperature range are preferred. The vegetables are distributed upon the shelves of the rack and the rack is rolled into the box. The velocity of the air current in the box is reduced to a minimum approximating ten linear feet per minute by moving damper 27 to open position to permit maximum circulation between the walls and floor with minimum demand on the interior of the box for air. Under these conditions I have noted greatly improved keeping qualities in most of the fresh vegetables with a minimum of dehydration, wilting, sliming and the like.

It is now apparent that by the present invention I have provided a novel process and apparatus for the aging of meat and the storage of vegetables under controlled conditions of temperature, humidity and air flow in which relatively high humidities are maintained; in which uniform temperatures are maintained throughout the enclosure; in which for the aging of meat velocities of cooled and humid air of approximately fifty feet per minute are available; in which for the storage of vegetable minimum velocities approximating ten linear feet per minute of cooled and humid air are used; in which temperature variation at the walls of the enclosure are minimized; in which temperature variations of less than 1° F. throughout the enclosure are obtained; in which the walls of the enclosure are cooled and maintained at uniform temperatures by the passage of cooled and humidified air thereover and therethrough; in which a novel refrigerating system is employed using a conventional refrigerant; and in which temperature variations in the refrigerating coils are reduced below 1° F.

Where used hereafter in the claims the expression "porous walls" is to be understood as including all types of walls permitting the uniform passage of air therethrough and including metal walls provided with a plurality of equally spaced small diameter perforations all of which types of walls have approximately 8% open area with a pressure differential across each porous wall of approximately $\frac{1}{16}$" of water.

Changes to or modifications of the described illustrative embodiment of my invention may now be suggested to those skilled in the art without departing from my inventive concept. Reference should therefore be had to the appended claims to determine the scope of this invention.

What is claimed is:

1. In a method for maintaining a cooled humid atmosphere within an enclosure defined by opposing boundaries, the steps of flowing cooled humid air over a boundary thereof, passing a portion of this cooled humid air uniformly across the enclosure to the opposite boundary, flowing the rest of this cooled humid air under the enclosure to the said opposite boundary, flowing all of the cooled humid air over the said opposite boundary and thereafter collecting, cooling and recirculating the cooled humid air.

2. In a method for maintaining a cooled humid atmosphere within an enclosure defined by opposing boundaries, the steps of flowing cooled humid air downwardly over a boundary thereof, passing a portion of this cooled humid air uniformly across the enclosure to the opposite boundary, flowing the rest of this cooled humid air under the enclosure to the said opposite boundary, flowing all of the cooled humid air upwardly over the said opposite boundary and above and over the enclosure, collecting the cooled humid air above the enclosure and cooling and recirculating the cooled humid air.

3. In a method for maintaining a cooled humid atmosphere within an enclosure defined by opposing boundaries, the steps of flowing cooled humid air downwardly over a boundary thereof in amounts sufficient to inhibit temperature variations of more than 1° F. along the boundary, passing a portion of this cooled humid air uniformly across the enclosure at velocities up to seventy linear feet per minute to the opposite boundary, flowing the cooled humid air upwardly along the said opposite boundary in amounts sufficient to inhibit temperature variations of more than 1° F. along the said opposite boundary and above and over the enclosure, collecting the cooled humid air above the enclosure and cooling and recirculating the cooled humid air.

4. In a method for maintaining a cooled humid atmosphere within an enclosure defined by opposing boundaries, the steps of flowing cooled humid air downwardly over a boundary thereof in amounts sufficient to inhibit temperature variations of more than 1° F. along the boundary, passing a portion of this cooled humid air uniformly across the enclosure at velocities up to seventy linear feet per minute to the opposite boundary, flowing the remainder of this cooled humid air beneath the enclosure to the said opposite boundary, flowing the cooled humid air upwardly along the said opposite boundary in amounts sufficient to inhibit temperature variations of more than 1° F. along the said opposite boundary and above and over the enclosure, collecting the cooled humid air above the enclosure and cooling and recirculating the cooled humid air.

5. In apparatus as defined and particularly for the aging of meat or the preservation of vegetables including an enclosure having insulated side walls, insulated end walls, an insulated top and an insulated bottom, an opening in said insulated top, an insulated closure for said opening, a refrigerating system mounted on said closure, refrigerating coils in said refrigerating system supported beneath said closure and extending into said enclosure, a fan carried by said closure for circulating air over said coils, a porous wall spaced from each of said side walls and extending from said rear to said front walls, an air duct leading from said coils to the space between one of said side walls and the adjacent porous wall and a second air duct leading to said fan from the space between the other of said side walls and the adjacent porous wall.

6. Apparatus as defined in claim 5 including a second bottom spaced from said insulated bottom and extending between said porous walls and a manually adjustable damper extending between said bottoms for adjusting the flow of air between said bottoms.

7. In apparatus as defined including an enclosure having insulated side walls, insulated end walls, an insulated top, an insulated bottom, means for cooling air and means for circulating air over the cooling means, a porous wall spaced from one of said side walls, an imperforate upper section for said porous wall terminating below the insulated top, a second porous wall spaced from the other of said side walls terminating below the insulated top, a ceiling element extending from the top of said second named porous wall to the lower edge of said imperforate section, a second ceiling element extending from the upper edge of said imperforate section to the opposite insulated wall, means for receiving the circulating means in said second named ceiling element and means for supporting the cooling means between said second named ceiling element and the insulated top.

8. Apparatus as defined in claim 7 including a second bottom spaced from said insulated bottom and extending between said porous walls and a damper extending between said bottoms for adjusting the flow of air between said bottoms.

9. Apparatus as defined in claim 7 in which each porous wall is approximately 8% open area.

10. Apparatus as defined in claim 7 in which each porous wall is approximately 8% open area and has a pressure drop of the air passing therethrough of approximately $\frac{1}{16}$" of water.

ALLEN LATHAM, Jr.

REFERENCES CITED

The following references are of record in the file of this patent:

UNITED STATES PATENTS

| Number | Name | Date |
|---|---|---|
| 1,667,315 | Harris | Apr. 24, 1928 |
| 2,053,520 | Eisenmann | Sept. 8, 1936 |
| 2,120,825 | Wolfert | June 14, 1938 |
| 2,135,181 | Jones | Nov. 1, 1938 |
| 2,265,282 | Heinrich | Dec. 9, 1941 |
| 2,382,084 | Mathews | Aug. 4, 1945 |
| 2,437,215 | Wheeler et al. | Mar. 2, 1948 |
| 2,437,451 | Baird | Mar. 9, 1948 |